(12) United States Patent
Tidestav et al.

(10) Patent No.: US 10,498,369 B2
(45) Date of Patent: Dec. 3, 2019

(54) SIGNAL DISTRIBUTION NETWORK

(71) Applicant: Telefonaktiebolaget LM Ericsson (publ), Stockholm (SE)

(72) Inventors: Claes Tidestav, Bålsta (SE); Mikael Coldrey, Borås (SE); Virgile Garcia, Beijing (CN); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/753,058

(22) PCT Filed: Aug. 21, 2015

(86) PCT No.: PCT/EP2015/069228
§ 371 (c)(1),
(2) Date: Feb. 15, 2018

(87) PCT Pub. No.: WO2017/032391
PCT Pub. Date: Mar. 2, 2017

(65) Prior Publication Data
US 2018/0241421 A1    Aug. 23, 2018

(51) Int. Cl.
*H04B 1/00* (2006.01)
*H04B 7/06* (2006.01)
*H04B 7/0413* (2017.01)

(52) U.S. Cl.
CPC ........... *H04B 1/0075* (2013.01); *H04B 1/001* (2013.01); *H04B 1/005* (2013.01); *H04B 7/0617* (2013.01); *H04B 7/0413* (2013.01)

(58) Field of Classification Search
CPC .... H04B 1/0003; H04B 1/406; H04B 1/0075; H04B 7/0486; H04B 7/0469;
(Continued)

(56) References Cited

U.S. PATENT DOCUMENTS 6,282,184 B1    8/2001  Lehman et al.
8,755,834 B2 *  6/2014  Vaisanen ................ H04B 1/406
                                                      455/552.1
(Continued)

OTHER PUBLICATIONS

International Search Report and Written Opinion of the International Searching Authority, PCT/EP2015/069228, dated Apr. 20, 2016. 9 pages.

*Primary Examiner* — Thanh C Le
(74) *Attorney, Agent, or Firm* — Sage Patent Group

(57) ABSTRACT

There is provided a signal distribution network for an antenna arrangement comprising signal interfaces and antenna elements. The signal distribution network comprises a first signal processing module operatively connected between antenna elements and K of the signal interfaces. The signal distribution network comprises a second signal processing module operatively connected between antenna elements and M signal interfaces other than those operatively connected to the first signal processing module. Components of the second signal processing module have lower sampling rate than components of the first signal processing module. The signal distribution network is configured for simultaneous signalling between the antenna elements and the first signal processing module and between the antenna elements and the second signal processing module. There are also provided methods for processing signals in such a signal distribution network and computer programs for processing signals in such a signal distribution network.

24 Claims, 5 Drawing Sheets

(58) Field of Classification Search
CPC .. H04B 7/0617; H04B 7/0665; H04B 7/0452; H04W 72/0472; H04W 84/042; H04W 88/10
See application file for complete search history.

(56) References Cited

U.S. PATENT DOCUMENTS

| | | | |
|---|---|---|---|
| 8,792,839 B2* | 7/2014 | Hu | H04W 72/0473 455/127.1 |
| 2013/0044650 A1* | 2/2013 | Barker | H04B 7/10 370/278 |
| 2014/0050280 A1 | 2/2014 | Stirling-Gallacher et al. | |
| 2015/0078282 A1* | 3/2015 | Chae | H04B 7/024 370/329 |
| 2015/0201336 A1* | 7/2015 | Shad | H04W 16/28 455/63.4 |

* cited by examiner

SIGNAL DISTRIBUTION NETWORK

CROSS REFERENCE TO RELATED APPLICATIONS

This application is a 35 U.S.C. § 371 national stage application of PCT International Application No. PCT/EP2015/069228 filed on Aug. 21, 2015, the disclosure and content of which is incorporated by reference herein in its entirety.

TECHNICAL FIELD

Embodiments presented herein relate to signal distribution networks, and particularly to methods, a signal distribution network, computer programs, and a computer program product for processing a signal in a signal distribution network.

BACKGROUND

In communications networks, there may be a challenge to obtain good performance and capacity for a given communications protocol, its parameters and the physical environment in which the communications network is deployed.

For example, wireless communications networks configured to support very high data rates, such as several Gbps, will require very high bandwidth, in the order of several hundred MHz. To reach such bitrates, wireless communications networks may use massive antenna systems with very high number of antenna elements; antenna systems with several hundred antenna elements are envisioned. Massive multiple-input multiple output (MIMO) systems are also being developed. It is envisioned that such massive MIMO systems may have very many antenna elements. In addition, the antenna elements may all be individually controlled. Multi-user transmission may be applied. Coherent reciprocity may be utilized. The above disclosed exemplary wireless communications networks may thereby provide high end-user performance, as well as high system capacity and coverage.

Many of the proposed wireless communications networks have assumed that every antenna element can be individually controlled from digital baseband. This requires that there is an analog-to-digital converter (ADC) and digital-to-analog converter (DAC) per antenna element. A simplified view of a signal distribution network 100 for such a wireless communications network is illustrated in FIG. 1. The signal distribution network 100 provides a fully digital beamforming architecture where the actual beamforming occurs through digital signal processing. The signal distribution network 100 has L signal outputs and comprises N antenna elements 130, where the signals between the antenna elements 130 and the signal inputs are fed through analogue-to-digital converters 120 and a digital beamforming network 110. Typically, N>L.

As there are many antenna elements, there will be many ADCs and DACs. State-of-the-art wireless communications networks have quite high data rates, which requires high sampling rate of the ADC/DACs. The bit resolution of the ADC/DACs is also quite high, to cater for the requirements of the data transmissions.

Often in radio access network nodes, the digital baseband is installed at a site separate from the antenna site. According to one example the digital baseband is implemented in a digital unit (DU) whereas the antenna-near functionality, including ADC/DACs and power amplifiers (PAs) is implemented in a remote radio unit (RRU). According to this example, all the downlink (DL) data needs to be transmitted from the DU to the RRU, and all uplink (UL) measurements need to be transmitted from the RRU site to the DU. Here it is thus assumed that the signal distribution network 100 is implemented in a radio access network node serving wireless terminals, where the DL thus refers to transmission from the radio access network node to the wireless terminals, and where the UL thus refers to transmission from the wireless terminals to the radio access network node.

The combination of many ADC/DACs (due to many antenna elements), the high sampling rate, and the high resolution may lead to very high power consumption and cost. The same factors also place high demands on the bandwidth between the RRU and the DU. This has resulted in an increased interest in beam-based schemes, sometimes known as analog or hybrid beamforming, where not all antenna elements are directly controlled from baseband. Instead, a set of directional beams are formed, and data is transmitted only using these directional beams. The number of directional beams is typically significantly smaller than the number of antenna elements.

The directional beams are often formed in the analog domain, which reduces the number of ADC/DAC to one per beam. A simplified version of a signal distribution network 200 configured as a hybrid beamformer is shown in FIG. 2. The signal distribution network 200 provides a hybrid beamforming architecture. Some spatial processing is performed in the analog domain and some in the digital domain. The signal distribution network 200 has L signal outputs and comprises N antenna elements 240, where the signals between the antenna elements 240 and the signal inputs are fed through an analogue beamforming network 230, K analogue-to-digital converters 220, and a digital beamforming network 210. Typically, $N \geq K > L$.

In a hybrid beamformer, all transmissions and receptions pass through the directional beams. In addition to the beamforming in the analog domain, additional beamforming takes place in the digital domain. The digital beamforming may in its simplest form utilize only a single beam that is best, or good enough, for a certain transmission. It is noted that signals cannot be received or transmitted in directions other than the directional beam directions without being (significantly) attenuated.

During initial access to a wireless communications network, the wireless terminal transmits a special signal. In LTE, this transmission occurs on the physical random access channel (PRACH). Since very little information is transmitted during the very initial access, this transmission only uses a small fraction, say around 1 MHz, of bandwidth. As the wireless communications network does not know the location of the wireless terminal when the PRACH is transmitted, the direction from which the PRACH reaches the radio access network node in the wireless communications network is unknown.

Hence, one issue with signal distribution networks having a beam-based architecture as compared to a fully digital architecture is its inability to receive signals from all directions at the same time, or, alternatively, to receive a signal from an unknown direction. Signals that arrive from other directions than those of the directional beams will be significantly suppressed by the antenna diagram. One example of such a signal is the PRACH.

For PRACH reception with hybrid beamforming architecture the PRACH transmission is, according to state-of-the-art, repeated and the available directional beams are looped through until the PRACH is received via a beam pointing in the right direction. This leads to delays and to a complicated joint design of antenna sweep pattern and PRACH transmissions.

While PRACH reception has been provided as an illustrative example, similar issues are present also for other types of signals.

Hence, there is still a need for an improved low-complexity signal distribution network.

SUMMARY

An object of embodiments herein is to provide an efficient signal distribution network According to a first aspect there is presented a signal distribution network for an antenna arrangement comprising signal interfaces and antenna elements. The signal distribution network comprises a first signal processing module operatively connected between antenna elements and K of the signal interfaces. The signal distribution network comprises a second signal processing module operatively connected between antenna elements and M signal interfaces other than those operatively connected to the first signal processing module. Components of the second signal processing module have lower sampling rate than components of the first signal processing module. The signal distribution network is configured for simultaneous signalling between the antenna elements and the first signal processing module and between the antenna elements and the second signal processing module.

Advantageously this provides an efficient signal distribution network, yet of low complexity.

Advantageously, with the proposed signal distribution network, it is possible to receive low-rate signals from many directions and at the same time receive high-rate signals from a few directions, with low power consumption.

Advantageously, the proposed signal distribution network enables low-rate signals to be multiplexed and jointly transmitted over a transport link.

Advantageously, the proposed signal distribution network can be extended to any number of parallel systems.

Advantageously, the proposed signal distribution network can be used in a dual-purpose system where a second system with narrower signal bandwidth can be implemented in parallel with a first system with wider signal bandwidth. By using the proposed signal distribution network, both systems can thus share the same antennas. This is more cost effective than needing both systems (having their individual set of antennas), especially when the number of antennas is very large. An example of a system with narrower signal bandwidth can be a Machine Type Communication (MTC) system where for example a large number of sensors or other machines communicate low bit rate signals from many directions. An example of a high-rate system is a mobile broadband (MBB) system.

Advantageously, the proposed signal distribution network can be used in a single system wherein certain types of low-rate traffic are dedicated to a smaller part of the system bandwidth.

According to a second aspect there is presented an antenna arrangement comprising a signal distribution network according to the first aspect.

According to a third aspect there is presented a network node comprising a signal distribution network according to the first aspect.

According to a fourth aspect there is presented a terminal device comprising a signal distribution network according to the first aspect.

According to a fifth aspect there is presented a method for processing a signal in a signal distribution network for an antenna arrangement comprising signal interfaces and antenna elements. The method comprises receiving a signal from antenna elements of the antenna arrangement. The method comprises feeding the received signal through a signal distribution network according to the first aspect. The method comprises providing the signal having been fed through the signal distribution network to all signal interfaces of the antenna arrangement.

According to a sixth aspect there is presented a method for processing a signal in a signal distribution network for an antenna arrangement comprising signal interfaces and antenna elements. The method comprises acquiring a signal from all signal interfaces of the antenna arrangement. The method comprises feeding the received signal through a signal distribution network according to the first aspect. The method comprises providing the signal having been fed through the signal distribution network to antenna elements of the antenna arrangement.

According to a seventh aspect there is presented a computer program for processing a signal in a signal distribution network for an antenna arrangement comprising signal interfaces and antenna elements, the computer program comprising computer program code which, when run on a signal distribution network, causes the signal distribution network to perform a method according to the fifth aspect.

According to an eight aspect there is presented a computer program for processing a signal in a signal distribution network for an antenna arrangement comprising signal interfaces and antenna elements, the computer program comprising computer program code which, when run on a signal distribution network, causes the signal distribution network to perform a method according to the sixth aspect.

According to an ninth aspect there is presented a computer program product comprising a computer program according to at least one of the seventh aspect and the eight aspect and a computer readable means on which the computer program is stored.

It is to be noted that any feature of the first, second, third, fourth, fifth, sixth, seventh, eight and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, an object of embodiments herein is to provide an efficient signal distribution network. There is provided a signal distribution network 390, methods performed by the signal distribution network 390, computer programs comprising code, for example in the form of a computer program product, that when run on a signal distribution network 390, causes the signal distribution network 390 to perform the methods.

Figure 1:
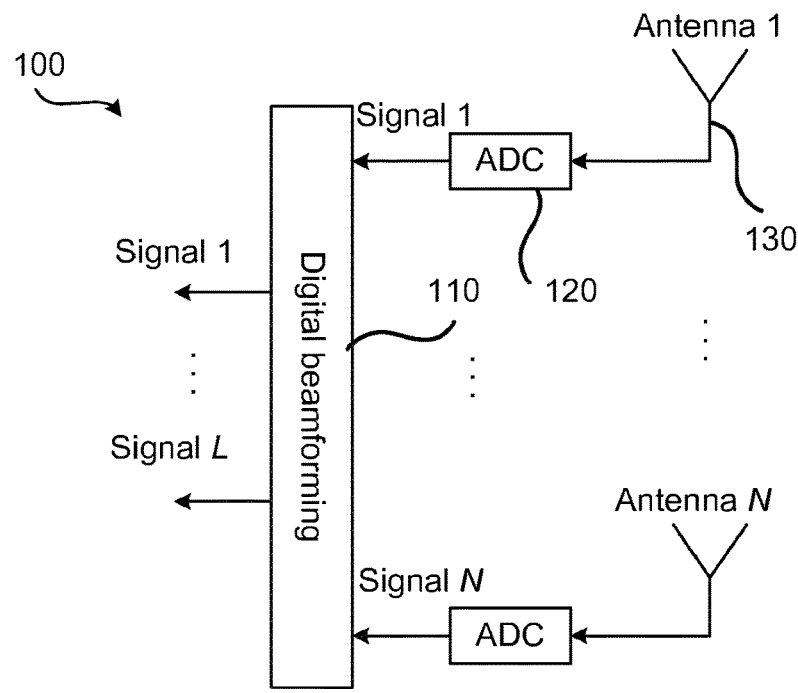
FIGS. 1 and 2 are schematic diagrams illustrating antenna arrangements according to state of the art.
Figure 2:
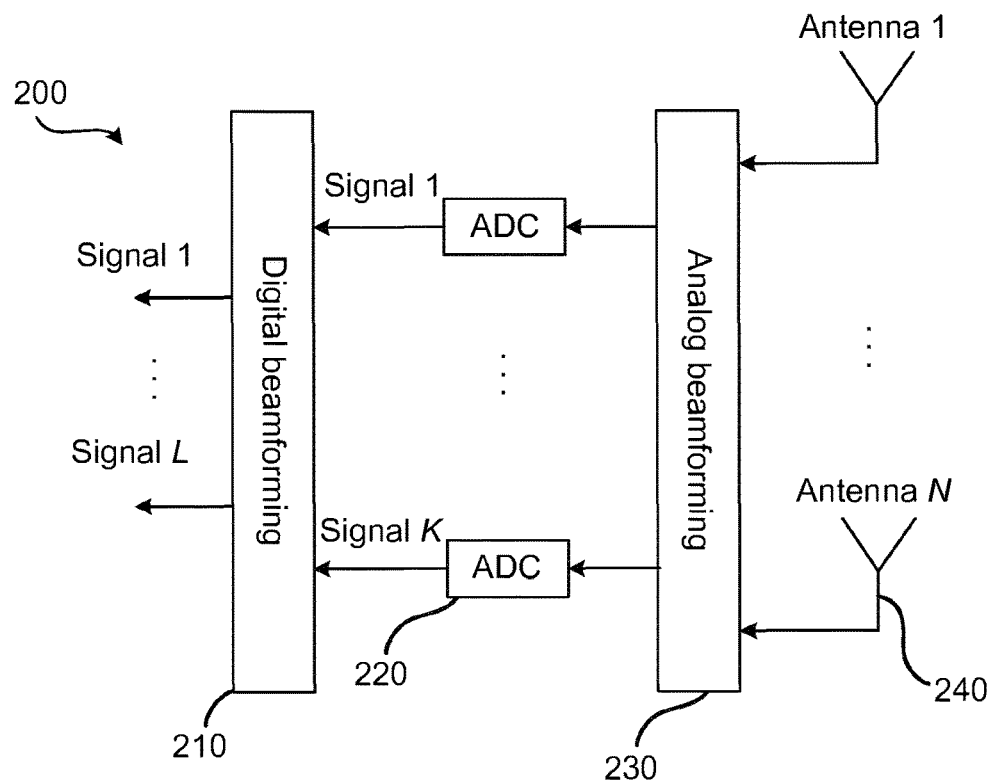
Figure 3:
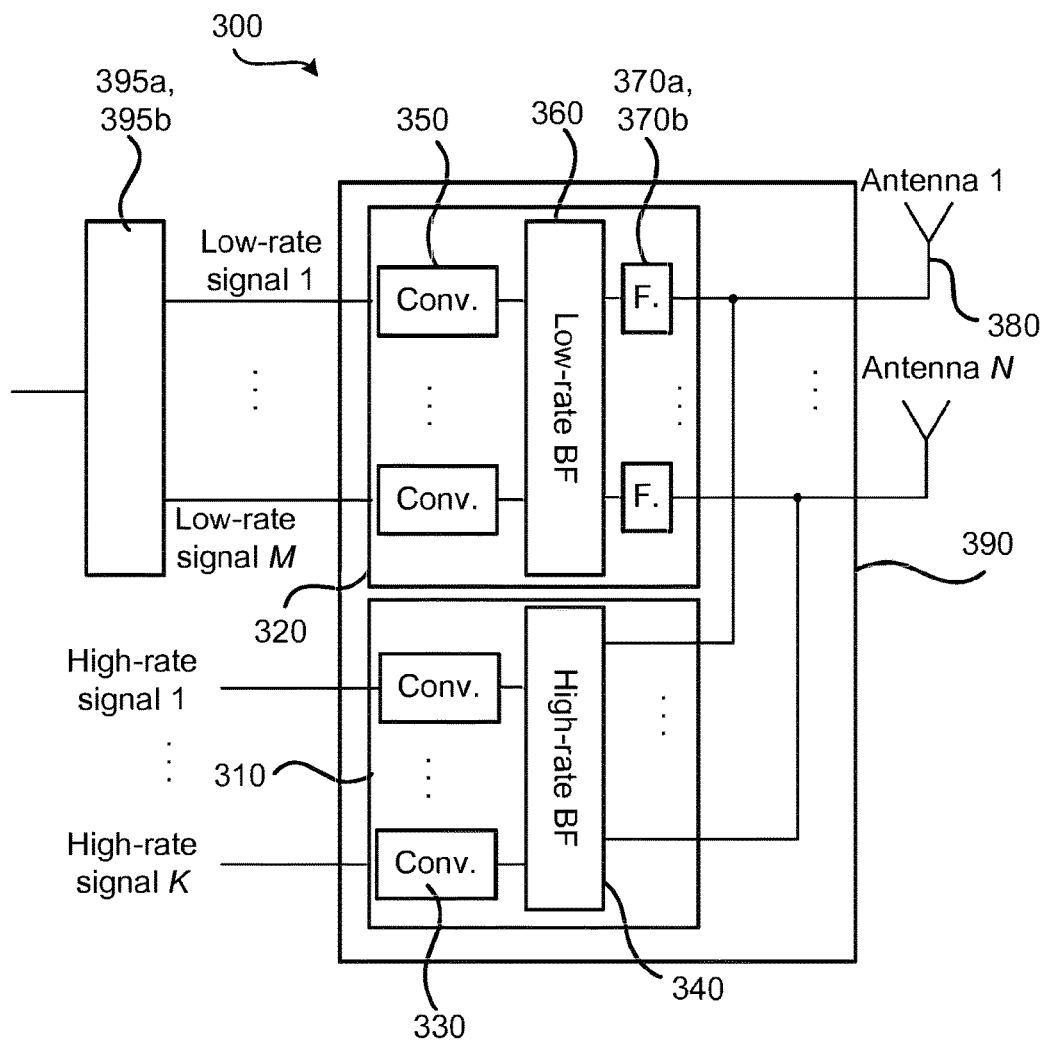
FIG. 3 is a schematic diagram illustrating an antenna arrangement according to embodiments.

Reference is now made to FIG. 3 illustrating a signal distribution network 390 for an antenna arrangement 300 according to an embodiment.

The antenna arrangement 300 comprises K+M signal interfaces and N antenna elements 380. The total number of signal interfaces (i.e., K+M) can be larger than the number of antenna elements 380, i.e., N.

The signal distribution network 390 comprises a first signal processing module 310. The first signal processing module 310 is operatively connected between antenna elements 380 and K of the signal interfaces. The first signal processing module 310 may be operatively connected between all antenna elements 380 and K of the signal interfaces.

The signal distribution network 390 further comprises a second signal processing module 320. The second signal processing module 320 is operatively connected between antenna elements 380 and M of the signal interfaces. The second signal processing module 320 is operatively connected between all antenna elements 380 and M of the signal interfaces. These M of the signal interfaces are other than those operatively connected to the first signal processing module 310.

Components of the second signal processing module 320 have lower sampling rate than components of the first signal processing module 310. Examples of components of the second signal processing module 320 and of the first signal processing module 310 will be provided below.

The signal distribution network 390 is configured for simultaneous signalling between the antenna elements 380 and the first signal processing module 310 and between the antenna elements 380 and the second signal processing module 320.

The proposed signal distribution network 390 provides the possibility to receive or transmit any low-rate signal, such as PRACH, with low complexity/power consumption from any direction, whilst maintaining the possibility to receive high-rate signals through beam-based reception.

Embodiments relating to further details of the signal distribution network 390 will now be disclosed.

There may be different examples of first signal processing modules 310 and second signal processing modules 320. Embodiments related thereto will now be disclosed in detail.

According to an embodiment the first signal processing module 310 comprises a first set of converters 330. Each converter 330 is operatively connected to one of the K signal interfaces. According to an embodiment the second signal processing module 320 comprises a second set of converters 350. Each converter 350 is operatively connected to one of the M signal interfaces. The converters 350 of the second set have lower sampling rate than the converters 330 of the first set. Thus, there are two sets of converters, one set of converters 350 that can provide access to a low-rate sampled version of a transformed version of the antenna signal, and one set of converters 330 that can provide access to a high-rate sampled version of the directional beam outputs.

As will be further disclosed below, the converters may be analogue-to-digital converters or digital-to-analogue converters. According to an embodiment there are fewer converters in the first set of converters 330 than in the second set of converters 350.

For example, the first signal processing module 310 may comprise a beamforming network. Particularly, according to an embodiment the first signal processing module 310 comprises a first beamforming network. The first beamforming network 340 comprises fewer connections towards the converters 330 of the first set than towards the antenna elements 380. The first set of converters 330 are operatively connected to the antenna elements 380 via the first beamforming network 340. The first beamforming network 340 may be configured for high bit rate signalling such as high bit rate data signalling. That is, the first beamforming network 340 may be configured to process data signalling. Further, the first beamforming network 340 may be configured to create and use a small set of beams.

For example, the second signal processing module 320 may comprise a second beamforming network 360. Particularly, according to an embodiment the second signal processing module 320 comprises a second beamforming network 360. The second beamforming network 360 comprises fewer or equal number of connections towards the converters 350 of the second set than towards the antenna elements 380. The second set of converters 350 are operatively connected to the antenna elements 380 via the second beamforming network 360.

The second beamforming network 360 may typically be configured to use a set of fixed directional beams. The second beamforming network 360 may also be omitted, in which case the signals from the antenna elements are fed directly to the converters 350 of the second set.

The second beamforming network 360 may be configured for low-rate signalling, such as control signalling or low-rate data signalling. That is, the second beamforming network 360 may be configured to process control signalling, such as PRACH signalling, PUSCH signalling, or MTC signalling, and/or (low bit rate) data signalling, such as VoIP signalling.

The signal distribution network 390 may further comprise different kinds of filters. Different embodiments relating thereto will now be described in turn.

For example, the signal distribution network 390 may comprise low-pass filters 370b. One low-pass filter 370b is operatively connected between the second beamforming network 360 and each one of the antenna elements 380. The low-pass filters 370b may be part of the second signal processing module 320.

For example, the signal distribution network 390 may comprise band-pass filters 370a. One band-pass filter 370a is operatively connected between the second beamforming network 360 and each one of the antenna elements 380. The band-pass filters 370a may be part of the second signal processing module 320. Each band-pass filter 370a may be combined with a frequency shifter operatively connected between the band-pass filters 370a and the second set of converters 350.

The first beamforming network 340 may be configured to process signals that have a bandwidth that is equal to the maximum bandwidth supported in the communications network in which the signal distribution network 390 is used.

Once the best directional beam for a certain wireless device is known, communication occurs through that directional beam, or through a subset of the directional beams. The directional beams used for communication can also be updated based on various measurements. The first beamforming network 340 may thus be configured to update a set of fixed beams for transmission and/or reception by the antenna elements 380 based on measurements of signals received from the antenna elements 380.

There may be different ways to select the sampling rates of the converters. For example, the converters 330 of the first set may have a sampling rate of about 1 GHz. For example, the converters 350 of the second set may have a signal dependent sampling rate, i.e., a sampling rate being dependent on which type of signal that is to be processed by the second set of converters 350.

The sampling rate of the converters 350 may thereby be tailored to fit the bandwidth of signals that can be expected to be received from any direction.

There may be different ways to select the resolutions of the converters. For example, the converters 330 of the first set may have a resolution of about 12-14 bits. For example, the converters 350 of the second set may have a resolution equal to, or lower than, the resolution of the converters 330 of the first set. For example, the converters 350 of the second set may have a signal-dependent resolution, i.e., a resolution being dependent on which type of signal that is to be processed by the second set of converters 350. Hence, the converters 350 of the second set may have a resolution tailored to the signal reception that can be anticipated, which is possibly lower than the resolution of the converters 330 of the first set, thereby enabling reduction of the power consumption of the signal distribution network 390 compared to the signal distribution network 100. The reduced bit rate also reduces the requirements on data processing and transport of data compared to the signal distribution network 100.

The signal distribution network 390 may have different kinds of configurations. Embodiments relating thereto will now be disclosed in detail.

In general terms, in parallel to high-rate communication over the directional beams, low-rate signals may be constantly scanned, inter alia for reception of non-scheduled signals, such as PRACH. This scanning may involve simultaneous searching in many directions. According to an embodiment the signal distribution network 390 is configured for scanning. In more detail, the second signal processing module 320 may be configured to scan for reception of non-scheduled signals from the antenna elements 380 simultaneously in a plurality of beam directions. Alternatively, the second signal processing module 320 may be configured to scan for reception of low-rate scheduled signals.

Furthermore, the received low-rate signals can also be used to estimate the best beam to be used for the subsequent communication with the wireless device, using the high-rate part of the beamformer, i.e., the first beamforming network 340. According to an embodiment the signal distribution network 390 is configured for estimation. In more detail, the signal distribution network 390 may be configured to estimate a beam direction of a received signal from a wireless device. The received signal is detected by the second signal processing module 320. The signal distribution network 390 may further be configured to determine, based on the estimate, which directional beam from a set of directional beams that is to be used by the first signal processing module 310 for transmission to the wireless device.

In one embodiment the signal outputs of the second set of converters 350 are processed at baseband directly at the output of the second set of converters 350. According to another embodiment signals from all or some of the converters are multiplexed and transferred to another node. Assuming that these signals are known to be low-rate will make it possible to efficiently transfer them. Particularly, the signal distribution network 390 may further comprise a multiplexer 395a. The multiplexer 395a is operatively connected to at least some of the second set of converters 350. The multiplexer 395a is configured to multiplex signals received from these second set of converters 350 into a single baseband signal.

For transmission multiplexer 395a is replaced by a demultiplexer 395b. Hence, according to an embodiment the signal distribution network 390 further comprises a demultiplexer 395b. The demultiplexer 395b is operatively connected to at least some of the second set of converters 350. The demultiplexer 395b is configured to demultiplex a single baseband signal into as many signals as number of these second set of converters 350. The demultiplexer 395b is further configured to provide the signals to these first set of converters 330 and/or these second set of converters 350.

According to an embodiment the signal distribution network 390 is configured for signal reception from the antenna elements 380. According to this embodiment all converters 330, 350 are analogue-to-digital converters (ADCs). According to another embodiment the signal distribution network 390 is configured for signal transmission to the antenna elements 380. According to this embodiment all converters 330, 350 are digital-to-analogue converters (DACs).

The proposed signal distribution network 390 may thus comprise one set of ADCs or DACs (as represented by the second set of converters 350) with sampling rate f2 and resolution r2 which are connected to each of the M outputs of second beamforming network 360, a further set of ADCs or DACs (as represented by the first set of converters 330) with sampling rate f1 and resolution r1 that are connected to the output of the K data beams, and a first beamforming network 340 that maps the individual antenna elements to a set of directional beams. The sampling rate f2 and resolution r2 may be determined such that the power consumption and complexity of the second set of converters 350 are lower than if the sampling rate f1 and resolution r1 would have been used.

Figure 4:
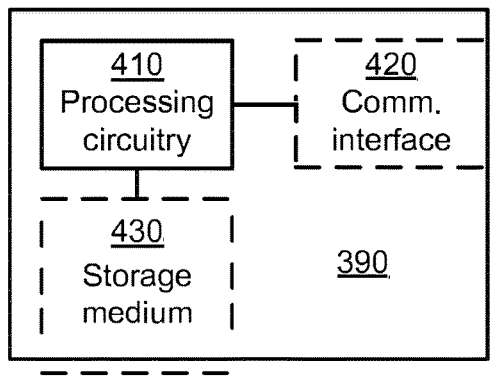
FIG. 4 is a schematic diagram showing functional units of a signal distribution network according to an embodiment.

FIG. 4 schematically illustrates, in terms of a number of functional units, the components of a signal distribution network 390 according to an embodiment. Processing circuitry 410 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 810 (as in FIG. 8), e.g. in the form of a storage medium 430.

Particularly, the processing circuitry 410 is configured to cause the signal distribution network 390 to perform a set of operations, or steps, S102-S326. These operations, or steps, S102-S326 will be disclosed below. For example, the storage medium 430 may store the set of operations, and the processing circuitry 410 may be configured to retrieve the set of operations from the storage medium 430 to cause the signal distribution network 390 to perform the set of operations. The set of operations may be provided as a set of executable instructions.

Thus the processing circuitry 410 is thereby arranged to execute methods as herein disclosed. The storage medium 430 may also comprise persistent storage, which, for example, can be any single one or combination of magnetic memory, optical memory, solid state memory or even remotely mounted memory. The signal distribution network 390 may further comprise a communications interface 420 for communications with other entities and devices, such as an antenna arrangement 300. As such the communications interface 420 may comprise one or more transmitters and receivers, comprising analogue and digital components. The processing circuitry 410 controls the general operation of the signal distribution network 390 e.g. by sending data and control signals to the communications interface 420 and the storage medium 430, by receiving data and reports from the communications interface 420, and by retrieving data and instructions from the storage medium 430. Other components, as well as the related functionality, of the signal distribution network 390 are omitted in order not to obscure the concepts presented herein.

Figure 5:
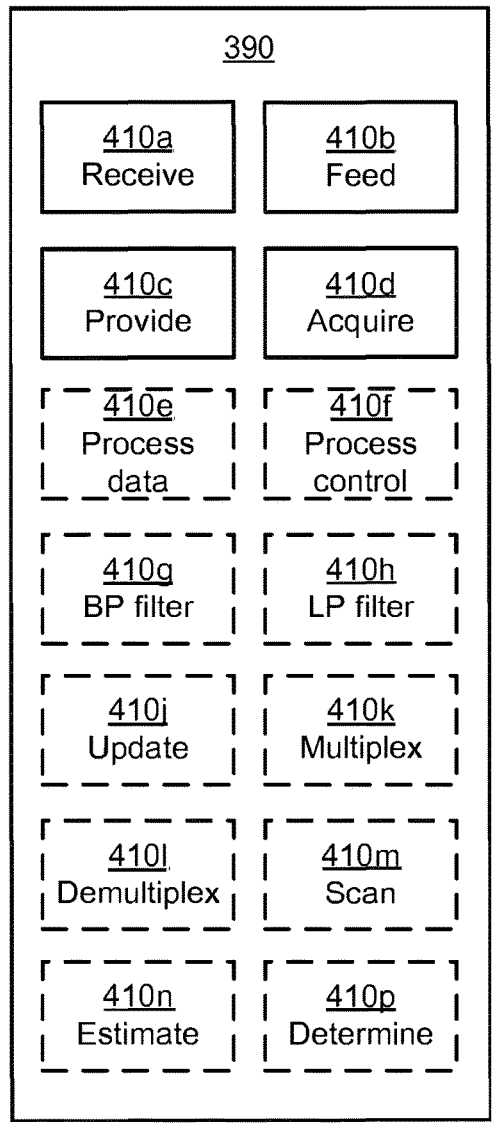
FIG. 5 is a schematic diagram showing functional modules of a signal distribution network according to an embodiment.

FIG. 5 schematically illustrates, in terms of a number of functional modules, the components of a signal distribution network 390 according to an embodiment. The functionality of each functional module 410a-410p will be further disclosed below in the context of which the functional modules 410a-410p may be used. The signal distribution network 390 of FIG. 5 comprises a number of functional modules; a receive module 410a configured to perform below step S102, a feed module 410b configured to perform below steps S104, S204, a provide module 410c configured to perform below steps S106, S206, and an acquire module 410d configured to perform below step S202. The signal distribution network 390 of FIG. 5 may further comprises a number of optional functional modules, such as any of a process data module 410e configured to perform below step S308, a process control module 410f configured to perform below step S310, a band-pass filter module 410g configured to perform below step S312, a low-pass filter module 410h configured to perform below step S314, an update module 410j configured to perform below step S316, a multiplex module 410k configured to perform below step S320, a demultiplex module 410l configured to perform below step S318, a scan module 410m configured to perform below step S322, an estimate module ion configured to perform below step S324, and a determine module 410p configured to perform below step S326. In general terms, each functional module 410a-410p may be implemented in hardware or in software. Preferably, one or more or all functional modules 410a-410p may be implemented by the processing circuitry 410, possibly in cooperation with functional units 420 and/or 430. The processing circuitry 410 may thus be arranged to from the storage medium 430 fetch instructions as provided by a functional module 410a-410p and to execute these instructions, thereby performing any steps as will be disclosed hereinafter.

The signal distribution network 390 may be provided as a standalone device or as a part of a further device. For example, the signal distribution network 390 may be provided in an antenna arrangement 300. Hence, an antenna arrangement 300 may comprise a signal distribution network 390 as herein disclosed. The antenna arrangement 300 may be part of a radio access network node (such as a radio base station, a base transceiver station, a nodeB, an evolved nodeB, or a remote radio unit). The antenna arrangement 300 may additionally or alternatively be part of a terminal device (such as a mobile station, mobile phone, handset, wireless local loop phone, user equipment (UE), smartphone, laptop computer, tablet computer, or modem).

Figure 6:
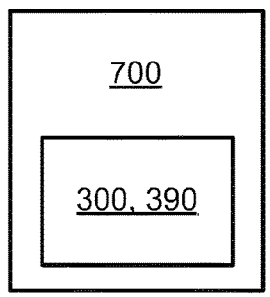
FIG. 6 is a schematic diagram illustrating a network node according to an embodiment.
Figure 7:
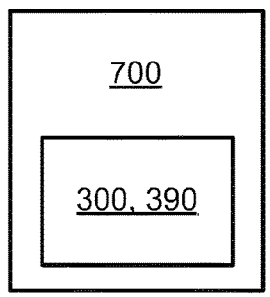
FIG. 7 is a schematic diagram illustrating a terminal device according to an embodiment.

FIG. 6 schematically illustrates a network node 600 comprising a signal distribution network 390 or antenna arrangement 300 comprising such a signal distribution network 390. FIG. 7 schematically illustrates a terminal device 700 comprising a signal distribution network 390 or an antenna arrangement 300 comprising such a signal distribution network 390. The signal distribution network 390 or the antenna arrangement 300 may be provided as an integral part of the network node 600 or the terminal device 700. That is, the components of the signal distribution network 390 or the antenna arrangement 300 may be integrated with other components of the network node 600 or terminal device 700; some components of the network node 600 or terminal device 700 and the signal distribution network 390 or the antenna arrangement 300 may be shared.

Figure 8:
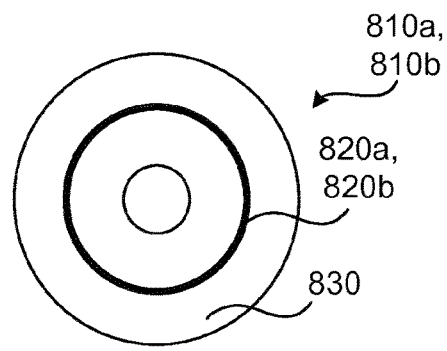
FIG. 8 shows one example of a computer program product comprising computer readable means according to an embodiment.

FIG. 8 shows one example of a computer program product 810a, 810b comprising computer readable means 830. On this computer readable means 830, a computer program 820a, 820b can be stored, which computer program 820a, 820b can cause the processing circuitry 410 and thereto operatively coupled entities and devices, such as the communications interface 420 and the storage medium 430, to execute methods according to embodiments described herein. The computer program 820a, 820b and/or computer program product 810a, 810b may thus provide means for performing any steps as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

Figure 9:
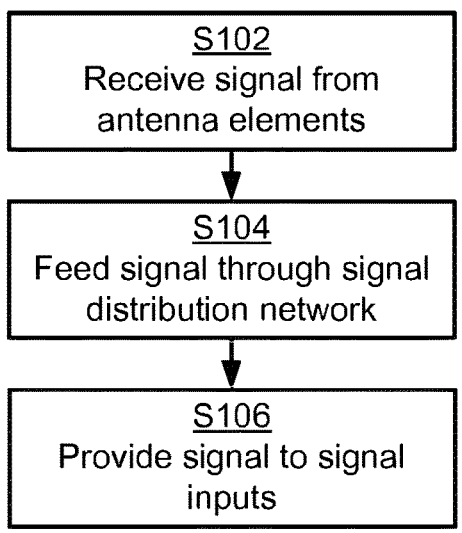
FIGS. 9, 10, and 11 are flowcharts of methods according to embodiments.
Figure 10:
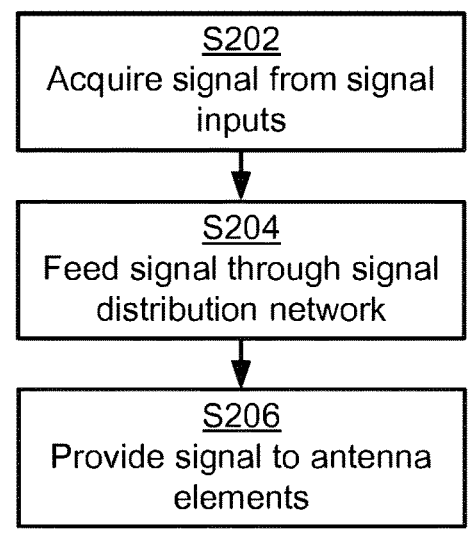
Figure 11:
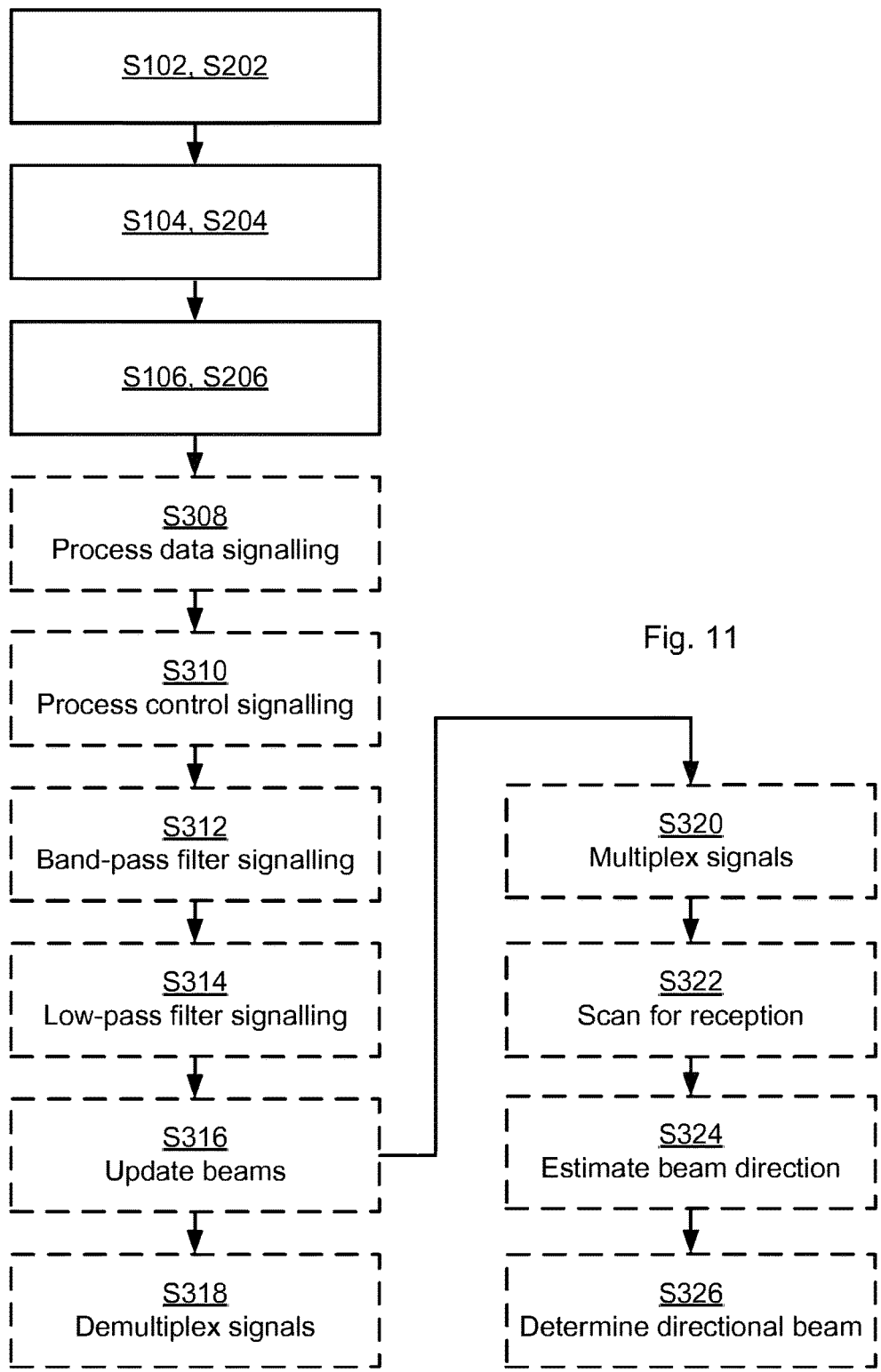

FIGS. 9, 10, and 11 are flow chart illustrating embodiments of methods for processing a signal in a signal distribution network 390. The methods are performed by the signal distribution network 390. The methods are advantageously provided as computer programs 820a, 820b.

Reference is now made to FIG. 9 illustrating a method for processing a signal in a signal distribution network 390 as performed by the signal distribution network 390 according to an embodiment. The antenna arrangement 300 comprises signal interfaces and antenna elements 380.

This embodiment is based on configuring the signal distribution network 390 for signal reception from the antenna arrangement 380.

The signal distribution network 390 is therefore configured to, in a step S102, receive a signal from antenna elements 380 of the antenna arrangement 300. These antenna elements 380 may be all the antenna elements 380 of the antenna arrangement 300.

After having received the signal, the signal is fed through the signal distribution network 390. Hence, the signal distribution network 390 is configured to, in a step S104, feed the received signal through a signal distribution network 390 as disclosed above.

The signal distribution network 390 is then configured to, in a step S106, provide the signal having been fed through the signal distribution network 390 to all signal interfaces of the antenna arrangement 300.

Reference is now made to FIG. 10 illustrating a method for processing a signal in a signal distribution network 390 as performed by the signal distribution network 390 according to an embodiment.

The antenna arrangement 300 comprises signal interfaces and antenna elements 380.

This embodiment is based on configuring the signal distribution network 390 for signal transmission through the antenna arrangement 380.

The signal distribution network 390 is therefore configured to, in a step S202, acquire a signal from all signal interfaces of the antenna arrangement 300.

After having acquired the signal, the signal is fed through the signal distribution network 390. Hence, the signal distribution network 390 is configured to, in a step S204, feed the acquired signal through a signal distribution network 390 as disclosed above.

The signal distribution network 390 is then configured to, in a step S206, provide the signal having been fed through the signal distribution network 390 to antenna elements 380 of the antenna arrangement 300. These antenna elements 380 may be all antenna elements of the antenna arrangement 300.

Reference is now made to FIG. 11 illustrating methods for processing a signal in a signal distribution network 390 as performed by the signal distribution network 390 according to further embodiments.

Embodiments relating to further details of processing a signal in a signal distribution network 390 will now be disclosed.

As disclosed above, the first beamforming network 340 may be configured to process data signalling. The signal distribution network 390 may therefore be configured to, in a step S308, process data signalling.

As disclosed above, the first beamforming network 340 may be configured to process control signalling. The signal distribution network 390 may therefore be configured to, in a step S310, process control signalling.

As disclosed above, the signal distribution network 390 may comprise band-pass filters 370a. The signal distribution network 390 may thereby be configured to, in a step S312, band-pass filter the acquired or received during feeding the acquired or received signal through the signal distribution network 390.

As disclosed above, the signal distribution network 390 may comprise low-pass filters 370b. The signal distribution network 390 may thereby be configured to, in a step S314, low-pass filter the acquired or received during feeding the acquired or received signal through the signal distribution network 390.

As disclosed above, the first beamforming network 340 may be configured to update a set of fixed beams. The signal distribution network 390 may therefore be configured to, in a step S316, update a set of fixed beams for transmission and/or reception by the antenna elements 380 based on measurements of signals received from the antenna elements 380.

As disclosed above, the signal distribution network 390 may be configured for signal transmission or reception.

An embodiment related to the signal distribution network 390 being configured for transmission will now be disclosed.

As disclosed above, when configured for transmission, the signal distribution network 390 may comprise a demultiplexer 395b operatively connected to at least some of the second set of converters 350. The signal distribution network 390 may therefore be configured to, in a step S318, demultiplex a single baseband signal into as many signals as this number of second set of converters 350; and to provide the signals to these converters of the first set of converters 330 and/or second set of converters 350.

Embodiments related to the signal distribution network 390 being configured for reception will now be disclosed.

As disclosed above, the signal distribution network 390 may comprise a multiplexer 395a operatively connected to at least some of the second set of converters 350. The signal distribution network 390 may therefore be configured to, in a step S320, multiplex signals received from this number of second set of converters 350 into a single baseband signal.

The signal distribution network 390 may be configured to, in a step S322, scan for reception of non-scheduled signals from the antenna elements 380 simultaneously in a plurality of beam directions.

The signal distribution network 390 may therefore be configured to, in a step S324, estimate a beam direction of a received signal from a wireless device. The received signal is detected by the second signal processing module 320.

The signal distribution network 390 may therefore be configured to, in a step S326, determine, based on the estimate, which directional beam from a set of directional beams to be used by the first signal processing module 310 for transmission to the wireless device.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A signal distribution network for an antenna arrangement comprising signal interfaces and antenna elements, the signal distribution network comprising:

a first signal processing module operatively connected between the antenna elements and K of the signal interfaces, wherein the first signal processing module comprises a first beamforming network configured to process data signaling for communication via a wireless communications interface; and a second signal processing module operatively connected between the antenna elements and M of the signal interfaces other than those operatively connected to the first signal processing module, wherein the second signal processing module comprises a second beamforming network configured to process control signalling for communication via the wireless communications interface;

wherein components of the second signal processing module have a lower sampling rate than components of the first signal processing module; and wherein the signal distribution network is configured for simultaneous signalling between the antenna elements and the first signal processing module and between the antenna elements and the second signal processing module.

2. The signal distribution network according to claim 1, wherein the first signal processing module comprises a first set of converters, each converter of which is operatively connected to one of the K signal interfaces; wherein the second signal processing module comprises a second set of converters, each converter of which is operatively connected to one of the M signal interfaces, and the converters of the second set having a lower sampling rate than the converters of the first set.

3. The signal distribution network according to claim 2, wherein the converters of the first set have a sampling rate of about 1 GHz.

4. The signal distribution network according to claim 2, wherein the converters of the second set have a sampling rate being dependent on which type of signal is to be processed by the second set of converters.

5. The signal distribution network according to claim 2, wherein the converters of the first set have a resolution of about 12-14 bits.

6. The signal distribution network according to claim 2, wherein the converters of the second set have a resolution equal to or lower than the resolution of the converters of the first set.

7. The signal distribution network according to claim 2, wherein the converters of the second set have a resolution being dependent on which type of signal is to be processed by the second set of converters.

8. The signal distribution network according to claim 2, further comprising:
a multiplexer operatively connected to at least some of the second set of converters and configured to:
multiplex signals received from said some of the second set of converters into a single baseband signal.

9. The signal distribution network according to claim 2, further comprising:
a demultiplexer operatively connected to at least some of the second set of converters and configured to:
demultiplex a single baseband signal into as many signals as the number of said some of the second set of converters; and
provide said signals to said some of the first set of converters and/or second set of converters.

10. The signal distribution network according to claim 2, wherein there are fewer converters in the first set of converters than in the second set of converters.

11. The signal distribution network according to claim 2, wherein the signal distribution network is configured for signal reception from the antenna elements, and wherein all converters are analogue-to-digital converters.

12. The signal distribution network according to claim 2, wherein the signal distribution network is configured for signal transmission to the antenna elements, and wherein all converters are digital-to-analogue converters.

13. The signal distribution network according to claim 2, wherein the first beamforming network comprises:
fewer connections towards the converters of the first set than towards the antenna elements, wherein the first set of converters are operatively connected to the antenna elements via the first beamforming network.

14. The signal distribution network according to claim 13, wherein the first beamforming network is configured to:
create a set beams for transmission and/or reception by the antenna elements based on measurements of signals received from the antenna elements.

15. The signal distribution network according to claim 2, wherein the second beamforming network comprises:
fewer or equal number of connections towards the converters of the second set than towards the antenna elements, wherein the second set of converters are operatively connected to the antenna elements via the second beamforming network.

16. The signal distribution network according to claim 15, wherein the second beamforming network is further configured to process the data signalling, wherein the control signalling comprises PRACH signalling, PUSCH signalling, and/or MTC signalling, and the data signalling comprises VoIP signalling.

17. The signal distribution network according to claim 15, further comprising:
band-pass filters operatively connected between the second beamforming network and each of the antenna elements.

18. The signal distribution network according to claim 15, further comprising:
low-pass filters operatively connected between the second beamforming network and each of the antenna elements.

19. The signal distribution network according to claim 1, wherein the second signal processing module is configured to:
scan for reception of non-scheduled signals from the antenna elements simultaneously in a plurality of beam directions.

20. The signal distribution network according to claim 1, wherein the signal distribution network is configured to:
estimate a beam direction of a received signal from a wireless device, the received signal being detected by the second signal processing module; and
determine, based on said estimate, which directional beam from a set of directional beams to be used by the first signal processing module for transmission to said wireless device.

21. A method for processing a signal in a signal distribution network for an antenna arrangement comprising signal interfaces and antenna elements, the method comprising:
receiving a signal from antenna elements of the antenna arrangement;
feeding the received signal through a signal distribution network comprising:
a first signal processing module operatively connected between the antenna elements and K of the signal interfaces, wherein the first signal processing module comprises a first beamforming network configured to process data signaling for communication via a wireless communications interface, and a second signal processing module operatively connected between the antenna elements and M of the signal interfaces other than those operatively connected to the first signal processing module, wherein the second signal processing module comprises a second beamforming network configured to process control signaling for communication via the wireless communications interface, wherein components of the second signal processing module have a lower sampling rate than components of the first signal processing module, and wherein the signal distribution network is configured for simultaneous signalling between the antenna elements and the first signal processing module and between the antenna elements and the second signal processing module; and providing the signal having been fed through the signal distribution network to all K+M signal interfaces of the antenna arrangement.

22. A method for processing a signal in a signal distribution network for an antenna arrangement comprising signal interfaces and antenna elements, the method comprising:

acquiring a signal from all signal interfaces of the antenna arrangement;

feeding the received signal through a signal distribution network comprising:

a first signal processing module operatively connected between antenna elements and K of the signal interfaces, wherein the first signal processing module comprises a first beamforming network configured to process data signaling for communication via a wireless communications interface, and a second signal processing module operatively connected between antenna elements and M of the signal interfaces other than those operatively connected to the first signal processing module, wherein the second signal processing module comprises a second beamforming network configured to process control signaling for communication via the wireless communications interface, wherein components of the second signal processing module have a lower sampling rate than components of the first signal processing module, and wherein the signal distribution network is configured for simultaneous signalling between the antenna elements and the first signal processing module and between the antenna elements and the second signal processing module; and providing the signal having been fed through the signal distribution network to antenna elements of the antenna arrangement.

23. A non-transitory computer readable medium storing computer program code which, when run on processing circuitry of a signal distribution network, causes the signal distribution network to:

receive a signal from antenna elements of the antenna arrangement;

feed the received signal through a signal distribution network comprising:

a first signal processing module operatively connected between the antenna elements and K of the signal interfaces, wherein the first signal processing module comprises a first beamforming network configured to process data signaling for communication via a wireless communications interface, and a second signal processing module operatively connected between the antenna elements and M of the signal interfaces other than those operatively connected to the first signal processing module, wherein the second signal processing module comprises a second beamforming network configured to process control signaling for communication via the wireless communications interface, wherein components of the second signal processing module have a lower sampling rate than components of the first signal processing module, and wherein the signal distribution network is configured for simultaneous signalling between the antenna elements and the first signal processing module and between the antenna elements and the second signal processing module; and provide the signal having been fed through the signal distribution network to all signal interfaces of the antenna arrangement.

24. A non-transitory computer readable medium storing computer program code which, when run on processing circuitry of a signal distribution network, causes the signal distribution network to:

acquire a signal from all signal interfaces of the antenna arrangement;

feed the acquired signal through a signal distribution network comprising:

a first signal processing module operatively connected between the antenna elements and K of the signal interfaces, wherein the first signal processing module comprises a first beamforming network configured to process data signaling for communication via a wireless communications interface, and a second signal processing module operatively connected between the antenna elements and M of the signal interfaces other than those operatively connected to the first signal processing module, wherein the second signal processing module comprises a second beamforming network configured to process control signaling for communication via the wireless communications interface, wherein components of the second signal processing module have a lower sampling rate than components of the first signal processing module, and wherein the signal distribution network is configured for simultaneous signalling between the antenna elements and the first signal processing module and between the antenna elements and the second signal processing module; and provide the signal having been fed through the signal distribution network to antenna elements of the antenna arrangement.

\* \* \* \* \*